United States Patent
Chan

(10) Patent No.: US 7,111,237 B2
(45) Date of Patent: Sep. 19, 2006

(54) BLINKING ANNOTATION CALLOUTS HIGHLIGHTING CROSS LANGUAGE SEARCH RESULTS

(75) Inventor: Ning-Ping Chan, El Cerrito, CA (US)

(73) Assignee: qNaturally Systems Inc., Berkeley, CA (US)

( * ) Notice: Subject to any disclaimer, the term of this patent is extended or adjusted under 35 U.S.C. 154(b) by 37 days.

(21) Appl. No.: 10/529,089

(22) PCT Filed: Sep. 27, 2003

(86) PCT No.: PCT/US03/30629
§ 371 (c)(1),
(2), (4) Date: Mar. 24, 2005

(87) PCT Pub. No.: WO2004/042615
PCT Pub. Date: May 21, 2004

(65) Prior Publication Data
US 2006/0129915 A1   Jun. 15, 2006

Related U.S. Application Data

(60) Provisional application No. 60/414,624, filed on Sep. 30, 2002.

(51) Int. Cl.
*G06F 17/00* (2006.01)

(52) U.S. Cl. .............. 715/536; 715/512; 715/703; 707/4

(58) Field of Classification Search ........... 715/535, 715/512, 536, 703; 707/4
See application file for complete search history.

(56) References Cited

U.S. PATENT DOCUMENTS

| | | | | |
|---|---|---|---|---|
| 6,024,571 A | * | 2/2000 | Renegar | 434/157 |
| 6,091,415 A | * | 7/2000 | Chang et al. | 715/809 |
| 6,347,316 B1 | * | 2/2002 | Redpath | 707/10 |
| 6,604,101 B1 | * | 8/2003 | Chan et al. | 707/4 |
| 7,058,626 B1 | * | 6/2006 | Pan et al. | 707/4 |
| 2001/0029455 A1 | * | 10/2001 | Chin et al. | 704/277 |

* cited by examiner

*Primary Examiner*—Stephen Hong
*Assistant Examiner*—Adam Queler
(74) *Attorney, Agent, or Firm*—Leon E. Jew; Dahyee Law Group

(57) ABSTRACT

The invention provides a system and method for translingually searching a piece of information from an electronic document, a website or the Internet. The system first dialectally standardizes the primary query in the input language entered by the user and then translates the standardized query into an optimized search string in the target document language. Using the translated query, the system performs a search and highlights each matching object with an annotation callout or bubble to assist the user to navigate through the search results.

63 Claims, 13 Drawing Sheets

BLINKING ANNOTATION CALLOUTS HIGHLIGHTING CROSS LANGUAGE SEARCH RESULTS

This application claims priority to the U.S. provisional patent application Ser. No. 60/414,624, filed on 30 Sep. 2002, the contents of which are incorporated by reference herein.

BACKGROUND OF THE INVENTION

1. Field of the Invention

This invention relates generally to trans-lingual search and retrieval of search results. More particularly, the invention relates to a system and method for dynamically displaying linguistic annotation on trans-lingual search results in callouts or virtual bubbles.

2. Description of Prior Art

The World Wide Web is a fast expanding terrain of information available via the Internet. The sheer volume of documents available on different sites on the World Wide Web ("Web") warrants that there are efficient search tools for quick search and retrieval of relevant information. In this context, search engines assume great significance because of their utility as search tools that help the users to search and retrieve specific information from the Web by using keywords, phrases or queries.

A whole array of search tools is available these days for users to choose from in conducting their search. However, search tools are not all the same. They differ from one another primarily in the manner they index information or web sites in their respective databases using a particular algorithm peculiar to that search tool. It is important to know the difference between the various search tools because while each search tool does perform the common task of searching and retrieving information, each one accomplishes the task differently. Hence, the difference in search results from different search engines even though the same phrases/queries are inputted.

Search tools of different kinds fall broadly into five categories, i.e. directories, search engines, super engines; meta search engines; and special search engines.

Search tools like Yahoo, Magellan and Look Smart qualify as web directories. Each of these web directories has developed its own database comprising of selected web sites. Thus, when a user uses a directory like Yahoo to perform a search, he is searching the database maintained by Yahoo and browsing its contents.

Search engines like Infoseek, WebCrawler and Lycos use software programs such as "Web crawlers", "spiders" or "robots" that crawl around the Web and index, and catalogue the contents from different web sites into the database of the search engine itself. Web crawler programs are a subset of software agents programs with an unusual degree of autonomy which perform tasks for the user. These agents normally start with a historical list of links, such as server lists, and lists of the most popular or best sites, and follow the links on these pages to find more links to add to the database.

A more sophisticated class of search engines includes super engines, which use a similar kind of software as "Web crawlers", "robots" or "spiders." However, they are different from ordinary search engines because they index keywords appearing not only on the title but anywhere in the text of site content. Excite, OpenText, Hot Bot and Alta Vista are examples of super engines.

A meta search engine is a search engine that queries other search engines and then combines the results that are received from all. A user using a meta search engine actually browses through a whole set of search engines contained in the database of the meta search engine. Dogpile and Savvy Search are examples of meta search engines.

Special search engines are another type of search engines that cater to the needs of users seeking information on particular subject areas. Deja News and Infospace are examples of special search engines.

Thus, each one of these search tools is unique in terms of the way it performs a search and works towards fulfilling the common goal of making resources on the web available to users. Most search engines allow users to type in a few words, and then search for occurrences of these words in their database. Each one has a special way of deciding what to do about approximate spellings, plural variations, and truncation.

However, most of these search engines are limited in their scope in so far as most of these search engines cater to the needs of the English speaking community alone and help in the search and retrieval of monolingual documents only. Most of these search engines require input in English and search web sites that have information available in English only. In other words, most of the search tools cater primarily to the needs of the English speaking Internet users. This attribute renders these search tools almost useless to the non-English speaking Internet users who constitute as much as 75% of the Internet user population. This non-English speaking user community is unable to search English web sites since it cannot adequately input phrases or queries in English. Consequently, this large community of users is unable to benefit from the search tools and web documents available in English. This is a serious drawback, which has not been addressed by any of the existing search engines.

Likewise, the non-English speaking Internet users also create web sites to store information in non-English languages. This rich source of information is not available to query by English oriented search engines. As a result the English speaking population remains deprived of the resources available in the other languages of the world for the same reasons as discussed above.

As an example, when preparing a Chinese To-fu dish which calls for "shrimp caviare," a search was made on a super engine, such as altavista.com to check the availability of "shrimp caviare" anywhere in the world. A search using altavista.com under "all language" revealed no matching results under either "English" or "Chinese" setting. A search was then made for the English term "shrimp caviare" at china.com, which is a Chinese search engine, but to no avail. Subsequently, the term "shrimp caviare" was looked up in Chinese to find its Chinese equivalent. The Chinese equivalent thus found was "xiazi" (meaning, "shrimp roe"). This word was then used for making the search on china.com and yielded as many as twenty-four hits.

Ning-Ping Chan et al have been granted on Aug. 5, 2003 a US patent (U.S. Pat. No. 6,604,101) for their invention entitled "METHOD AND SYSTEM FOR TRANSLINGUAL TRANSLATION OF QUERY AND SEARCH AND RETRIAL OF MULTILINGUAL INFORMATION ON A COMPUTER NETWORK". The patent discloses and teaches a method for translating a query input by the user in a source language (also called the user's language or the subject language) into a target language (also called the object language) and searching and retrieving web documents in the target language and translating the web documents into the source language. According to this invention, the user first inputs a query in a source language through a unit such as the keyboard. This query is then processed by the server at the backend to extract content word from the input query. The next step takes place at the dialectal controller, which is present on the server and performs the function of dialectally standardizing the content word or words so extracted. During this process the user may be prompted for some more so as to refine the search by the user or in case dialectal standardization could not be performed using the initial input query. This is followed by the process of pre-search translation, which comprises of translating the dialectally standardized word into a target language through a translator. This process of translation is followed by inputting the translated word into a search engine in the target language. Such an input yields search results in the target language corresponding to the translated word. The results so obtained are then displayed in the form of site names (URL) which satisfy the search criteria. All the results thus obtained in the target language are then displayed on the user screen.

According to the user's needs such results may then be translated back either in whole or in part into the source language. Chan's patent aims at assisting a user to search the web by entering a query in the user's own language, called source language, and returning to the user an entire translation of a targeted web site. In many circumstances, for a user who has some basic knowledge about the target language, the translation of an entire document is not necessary. Instead, an instant bilingual annotation on some key words, phrases or sentences would be good enough.

Accordingly, it would be desirable to provide a system and method which enables a user enters a search entry in a language other than the principal language used in the document to be searched and automatically highlights each matching phrase or matching object in the search result with a callout or bubble which contains an artificial intelligence based bilingual annotation on the matching phrase or matching object.

It would be further desirable to provide a system and method which enables a remote user enters a search entry in a language other than the principal language used in a web site to be searched and automatically highlights each matching phrase or matching object in the search result with a callout or bubble which contains an artificial intelligence based bilingual annotation on the matching phrase or matching object.

It would be further desirable to provide a system and method which enables a remote user enters a search entry in a language other than the principal language used in a web search engine and automatically highlights each matching phrase or matching object in the returned search results with a callout or bubble which contains an artificial intelligence based bilingual annotation on the matching phrase or matching object.

SUMMARY OF THE INVENTION

The invention provides a system and method for translingually searching a piece of information from an electronic document, a website or the Internet. The system first dialectally standardizes the primary entry in the input language entered by the user and then translates and optimizes the standardized entry into a search query in an object language (also called target language). Using the optimized search query, the system performs a search and highlights each matching phrase or matching object with an annotation callout or bubble to assist the user to navigate through the search results.

The system can be tuned or configured to be compatible with any search engine which uses only one language. In one preferred embodiment, the invention is implemented as a software application which runs on the user's computer and operates to perform the following steps:

dialectally standardizing a primary entry in a first language entered by the user;
   translating the standardized entry and optimizing the translated into a search query in a second language;
   performing a search on the query; and
   sending a signal to highlight each matching phrase or matching object by associating a visual cue with said each matching phrase or matching object, said visual cue being adaptive to contain an annotation message.

In another preferred embodiment, the invention is implemented as a system which is incorporated in the backend server of a web site and operates to perform the following steps:

accepting a primary entry in a first language entered by the user from the web site hosted by the web server;
   dialectally standardizing the primary entry in the backend server;
   translating the standardized entry and optimizing the translated into a search query in a second language;
   performing a search on the query in the server's database;
   returning the search results; and
   sending a signal to highlight each matching phrase or matching object by associating a visual cue with said each matching phrase or matching object, said visual cue being adaptive to contain an annotation message.

In another preferred embodiment, the invention is implemented as a translingual web search engine hosted by a web server. The search engine is operable to perform the following steps:

accepting a primary entry in a first language entered by the user from the primary entry page of the web search engine hosted by the web server;
   dialectally standardizing the primary entry in the server side;
   translating the standardized entry and optimizing the translated into a search query in a second language;
   performing a search on the query cross the Internet;
   returning the search results; and
   sending a signal to highlight each matching phrase or matching object by associating a visual cue with said each matching phrase or matching object, said visual cue being adaptive to contain an annotation message.

The foregoing has outlined rather broadly, the more pertinent and important features of the present invention. The detailed description of the invention that follows is offered so that the present contribution to the art can be more fully appreciated.

BRIEF DESCRIPTION OF THE DRAWINGS

For a more succinct understanding of the nature and objects of the present invention, reference should be directed to the following detailed description taken in connection with the accompanying drawings in which.

DETAILED DESCRIPTION OF THE INVENTION

With reference to the drawings, the present invention will now be described in detail with regard for the best mode and the preferred embodiments. In its most general form, the invention comprises a program storage medium readable by a computer, tangibly embodying a program of instructions executable by the computer to perform the steps necessary to provide a user with one or more annotation callouts, each of which being associated with a matching phrase or matching object in an object language contained in the search results returned from a search program or a search engine with which the user conducts the search by entering a query in a subject language. In the context of this application, a "subject language" means the language, other than the principal language used in the document being searched, that is used by the user to enter his entry or query. Accordingly, an "object language" means the language, other than the subject language, that is used as the principal language in the document being searched. For illustration purpose, the subject language can be called "searcher's language" and the object language can be called "searchee's language".

Figure 1:
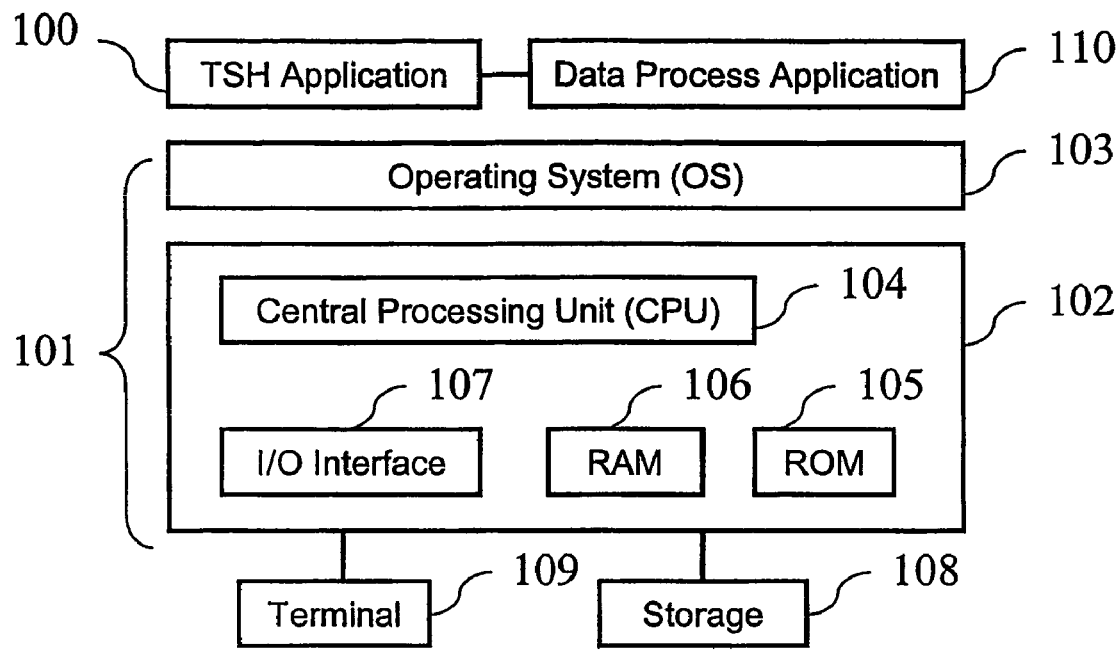
FIG. 1 is a schematic diagram illustrating a computer environment wherein the preferred embodiment of this invention operates.

FIG. 1 is a block diagram illustrating the computer environment in which the preferred embodiment of this invention operates. The computer environment includes a computer platform 101 which includes a hardware unit 102 and an operating system 103. The hardware unit 102 includes at least one central processing unit (CPU) 104, a read only random access memory (usually called ROM) 105 for storing application programs, a write/read random access memory (usually called RAM) 106 available for the application programs' operations, and an input/output (IO) interface 107. Various peripheral components are connected to the computer platform 101, such as a data storage device 108 and a terminal 109. A translingual search and halo (hereinafter as TSH) application 100 adapted to a data process application 110, such as Word, Word Perfect and Microsoft Excel etc., which supports a searchable document, runs on the computer platform 101. Those skilled in the art will readily understand that the invention may be implemented within other systems without fundamental changes.

Figure 2:
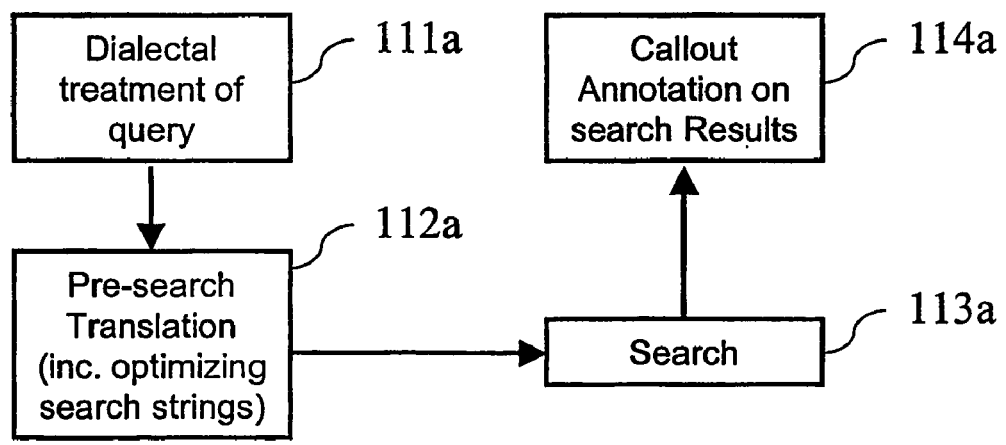
FIG. 2 is a block diagram illustrating the basic steps of the process according to this invention.

Broadly speaking, the system and method according to the present invention, as illustrated in FIG. 2, take place in four stages: dialectal treatment of the primary query entered by the user 111, pre-search translation of the primary query into the object language 112, search 113 on the translated query, and highlighting search result with callout annotation 114.

Figure 3:
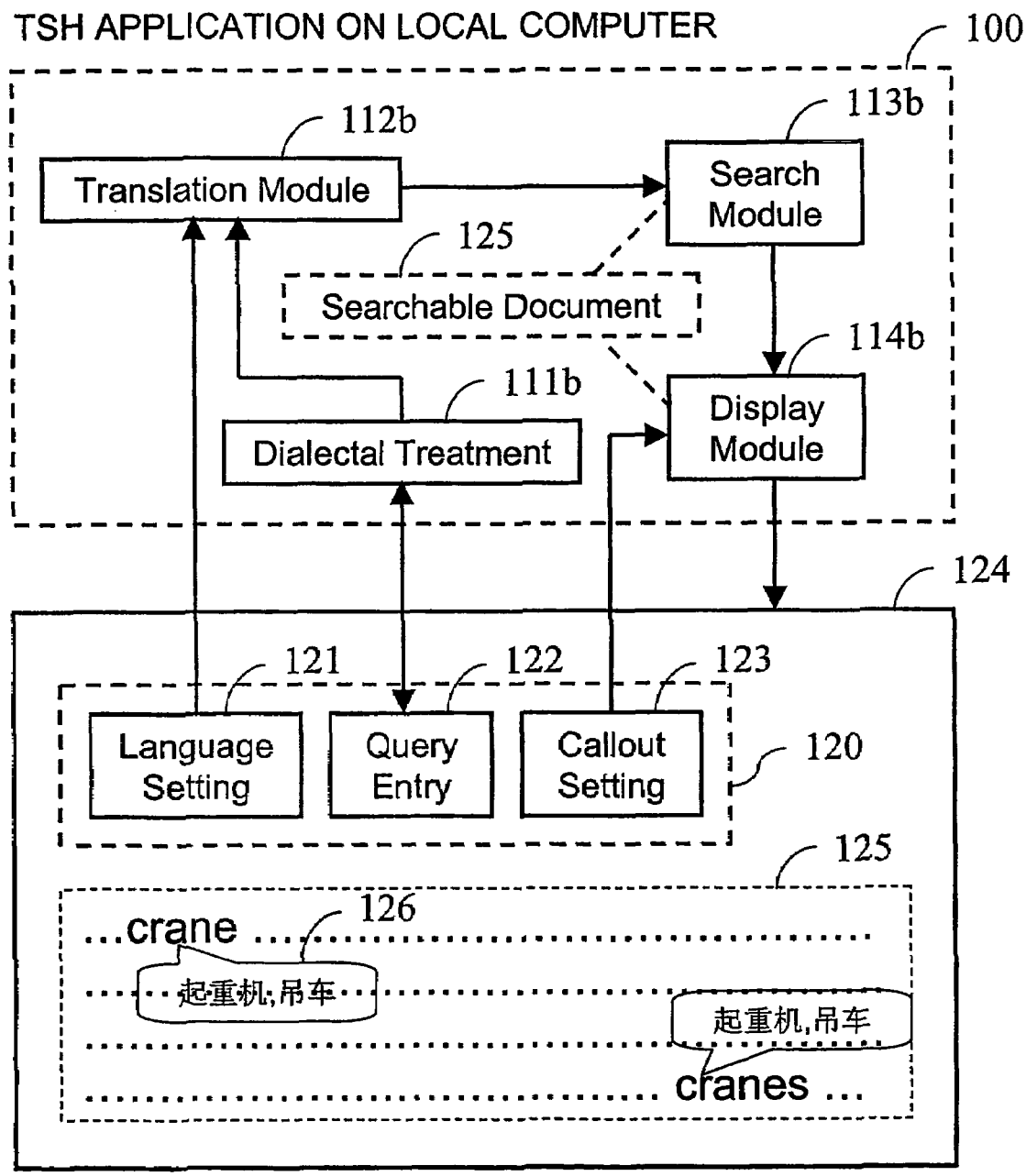
FIG. 3 is a schematic block diagram illustrating a system running on a local computer according to one preferred embodiment of this invention.

FIG. 3 is a schematic block diagram illustrating one preferred embodiment of the present invention. TSH application 100 is incorporated in a data process application which supports searchable documents. A user who opens a document 125 may conduct a search via a user graphical interface (GUI) 120 displayed on the user's screen 124. The user uses a language setting means 121 to set an object language, i.e. the language used in the document, and a subject language, i.e. the language to be used by the user to enter his search query. The language setting means 121 can be a dropdown list or a number of hyperlinked icons, each of which represents an option. Typically, the user selects one option. However, the system can be configured to enable the user to choose two or more at the same time. The default source and object languages are preset by the manufacturer but they can be re-set by the user. The default languages can be configured as the languages that the user used last time. In that case, the user does not need to set language every time when he activates TSH application. The dialectal treatment module 111$b$ is a program which is powerful enough to screen, analyze, and transform a non-common use query, such as slang phrase, dialect phrase, teen-language, or specialized terms in medicine, chemistry and botany etc., into a common use query or standardized query. For example, it knows to incorporate auto, automobile, vehicle etc. and standardize the input through statistical abstraction and fuzzy logic. Assuming the user chooses simplified Chinese (·体中文) as the subject language and English as the object language and then enters ""吊·"" as his primary search query from the query entry window 122. The dialectal treatment module 111$b$ maps the primary query ""吊·"" to a more frequently used synonym ""起重机"". Then the translator 112$b$ translates ""起重机"" into "crane" or "cranes" which is used as the search query for the search module 113b. The translator 112b is able to optimize the search query from many variants or equivalents including the brand names or trademarks which have already lost distinctness because of popular use (e.g Xerox, Kleenex, etc). Then, the display module 114b highlights each matching term found in the document with a blinking callout 126 which includes the primary query ""吊·"" and its equivalent ""起重机"". The callout annotation can be in a bilingual mode in which not only the query in the subject language but also the translated query and its variants (synonyms/equivalents) in the object language are displayed.

Figure 4:
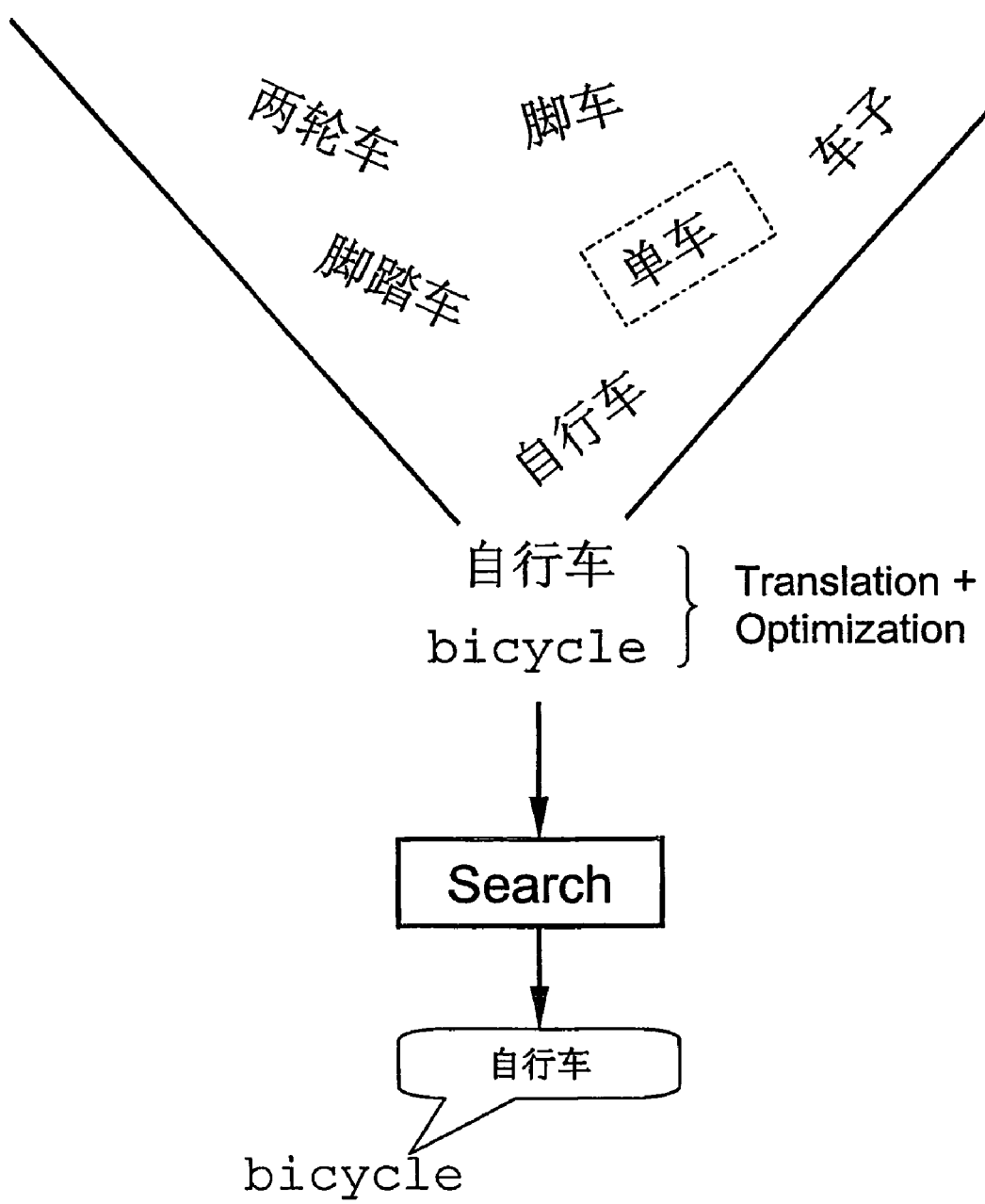
FIG. 4 is a schematic diagram illustrating the operations of the system according to FIG. 3.

FIG. 4 is a schematic diagram illustrating another example of the operation according to FIG. 3. In this example, the user enters ""自行·"" which is not a very popular term for bicycle in Chinese. The dialectal treatment module transforms it into ""自行·"" which represents the most popular, common usage for bicycle in Chinese. The translation module translates "自行·" into "bicycle" which is used as the query for the search module. In various deployments, the dialect treatment module and the translation module may be incorporated using a single module.

Dialectal treatment is an important step because often times words encountered have several different dialectal variations. A language such as English itself is full of dialectal variations in the form of British English, American English, Canadian English, Australian English, Indian English, and African English, etc. Good examples of dialectal variations in British English and American English include centre vs. center, lorry vs. truck, queue vs. line and petrol vs. gasoline etc. Similar instances could be cited in many of the other languages of the world, too. In Chinese, for example there are as many as forty five different dialectal variations for just one particular word. Such instances corroborate the fact that dialectal variations are the rule rather than the exception and therefore the only way to counter them is by standardizing a query or a word to a commonly known word.

In particular, the importance of dialectal treatment cannot be undermined in the present invention where the identified keyword needs to be given one consistent meaning. Otherwise, a single inconsistency could result in a wrong translation and ruin the entire search process during subsequent stages of search and information retrieval.

In the preferred embodiment of the present invention, if the dialectal treatment module fails to recognize the word and thus is unable to perform dialectal standardization, a query prompter unit may prompt the user for more input or request the user to choose from a set of expressions to assist, to clarify and to sharpen his query. In that case the user may submit another query to the query input means. Such a query may either be a standard term or a non-standard term. For example, different variants of the word "auto" including automobile and transportation vehicle are permitted to be input by the user as part of the dialectal standardization process.

Figure 5:
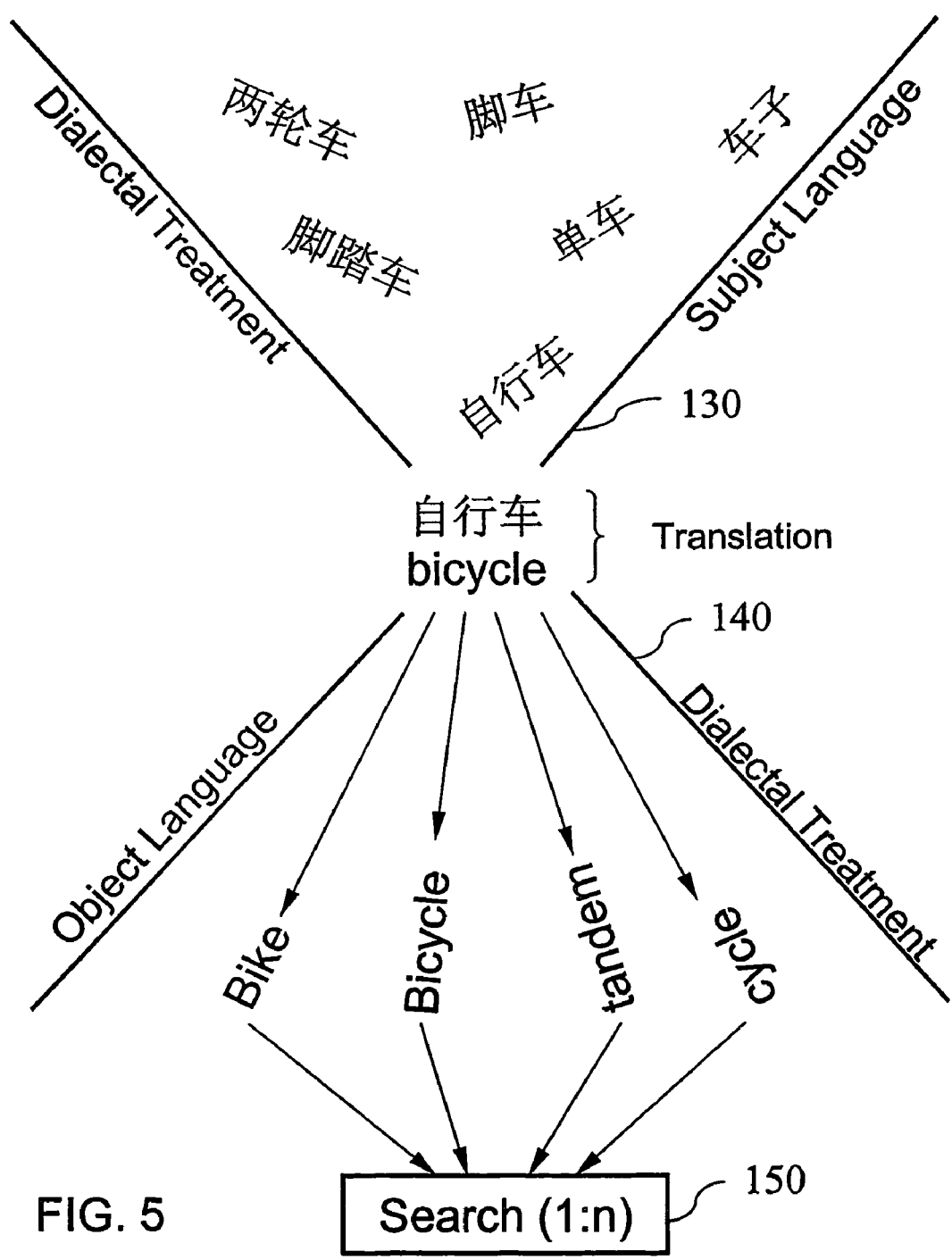
FIG. 5 is a schematic diagram illustrating a solution which includes a post-translation dialectal treatment step (i.e. query optimization step)
Figure 6:
FIG. 6 is a schematic diagram illustrating an exemplary callout which includes one or more equivalents of the translated query or the optimized query, each of which being hyperlinked, clicking on which triggering a new search on the clicked query equivalent.

FIG. 5 is a schematic diagram illustrating an extended solution in which a post-translation dialectal treatment (or optimization of the translated query) is added. The dialectal treatment includes two parts: a pre-translation treatment 130 which changes any non-common use query in subject language into a standardized query, and a post-translation treatment 140 which selects a best, most relevant translation as the translated query and identifies one or more equivalents to the translated query to be used as search queries. The search engine may perform the searches concurrently or consecutively. In the concurrent search case, if "bicycle" is the translated query, the search module performs a "bicycle OR bike OR cycle OR tandem" search based on a typical Boolean "OR" function which means that it is true if any of its arguments is true. In an automatic consecutive search case, the search order should be determined by the frequency of use of each synonym or equivalent. For example, if "taxi" is the translated query, then the search engine first search "taxi" and then searches "cab" assuming that "taxi" has a higher use frequency than "cab" according to linguistic statistics. The consecutive search can be performed according to the user's command. For example, the callout content may include the translated query in the object language and various synonyms or equivalents of the translated query. Each of the synonyms or equivalents, as illustrated in FIG. 6, is hyperlinked. When the user moves the mouse pointer over any of them, an automatic message, such as "click the underlined to make a new search", pops up on the screen. When the user clicks one of them, the search module performs a search on the clicked query. This is useful because in some circumstances the translated query by the translation module is not necessarily the best choice for the specific user and therefore the user's involvement is needed. For example, in some circumstances, a brand name or trademark may be more appropriate than a direct translation.

Referring back to FIG. 3, the user interface includes a callout setting means 123 from which the user may configure the parameters structuring and styling a callout, which is often referred to as a bubble, to be used to display annotation message. The annotation message may include various subject language synonyms of the primary entry or/and various object language synonyms of the translated query. The parameters include, but are not limited to, style, shape, font style and size, and background color. Similar to the language setting 121, the callout setting 123 can be a dropdown list or a number of hyperlinked icons, each of which represents an option. In one deployment, the language setting 121 and the callout setting 123 are incorporated into a single GUI 120. In another deployment, the language setting 121 and the callout setting 123 are coupled to a displayed callout in such a convenient manner that, for example, they are usually hidden but the user may access them by a right-clicking on the callout. Before the user changes these settings, they are in the default status or in the status as the user used the application last time.

A callout or a bubble used in this invention is a dynamically created visual cue overlaid on the computer screen. The visual cue may be transparent, half-transparent, or non-transparent. Although the style, shape, font style and size as well as background color can be preset by the user, the content displayed therein is determined by the display module 114b based on the outputs of the search module 113b, and optionally the translation module 112b. In a bilingual mode, the annotation content in the callout includes the standardized query in the subject language and the translated query in the object language. Preferably, the standardized query in the subject language and the translated query in the object language are in different lines. If the user chooses two subject languages at the same time from the language setting 121, the annotation content will be trilingual. It is possible that the user chooses several subject languages at the same time from the language setting 121 and obtains a multilingual annotation on the primary query entered by the user. Although the callout or the bubble can be fixed in size, preferably it is adaptive according to the content to be displayed. The term "adaptive" herein means elastic, flexible, scalable, automatically adjusted, to fit the content to be displayed. For example, when the query and its translation are very short, the callout or the bubble is relatively small; otherwise, it can be relatively large.

Figure 7:
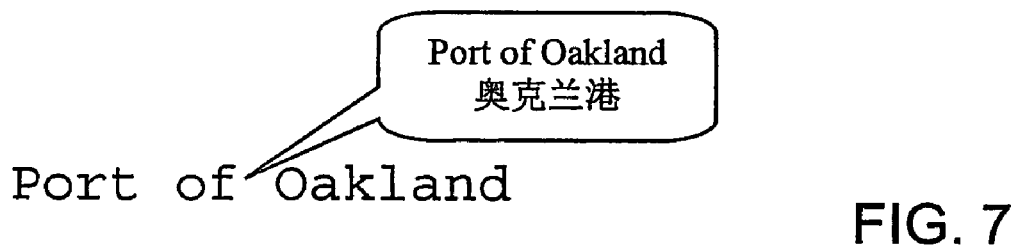
FIG. 7 is an exemplary rounded rectangular callout which is at the upper-right position of the matching phrase or matching object.
Figure 8:
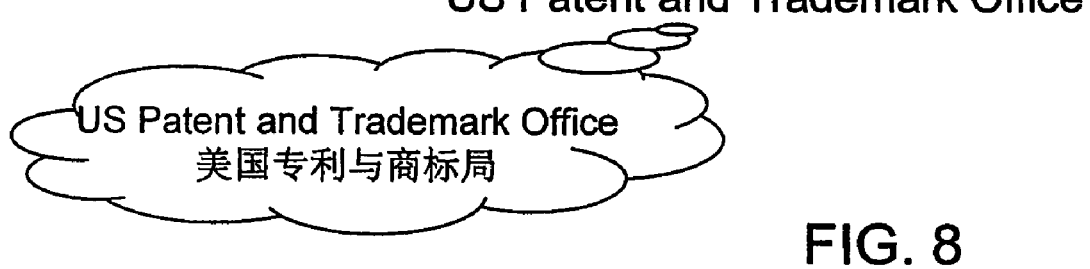
FIG. 8 is an exemplary cloud callout which is at the bottom-left position of the matching phrase or matching object.

FIG. 7 is schematic diagram illustrating a rounded rectangular annotation callout, which is placed at the upper right position of the matching phrase or matching object (Port of Oakland), and in which font "Time New Roman" is used. FIG. 8 is a schematic diagram illustrating a cloud annotation callout, which is placed at the bottom left position of the matching result, and in which font "Courier New" is used.

The difference between a callout and "bubble" is that the former has a body and a tail, but the latter has a body only. The tail is useful because it is often used as a reference connector between the annotation callout and the textual information which is annotated. Although a callout is preferably used in various embodiments of this invention, it does not deviate from the essence and scope of this invention if some other kind of visual cue such as square, rectangle, circle, bubble, or "kite" is used to display the returned annotation message.

Figure 9:
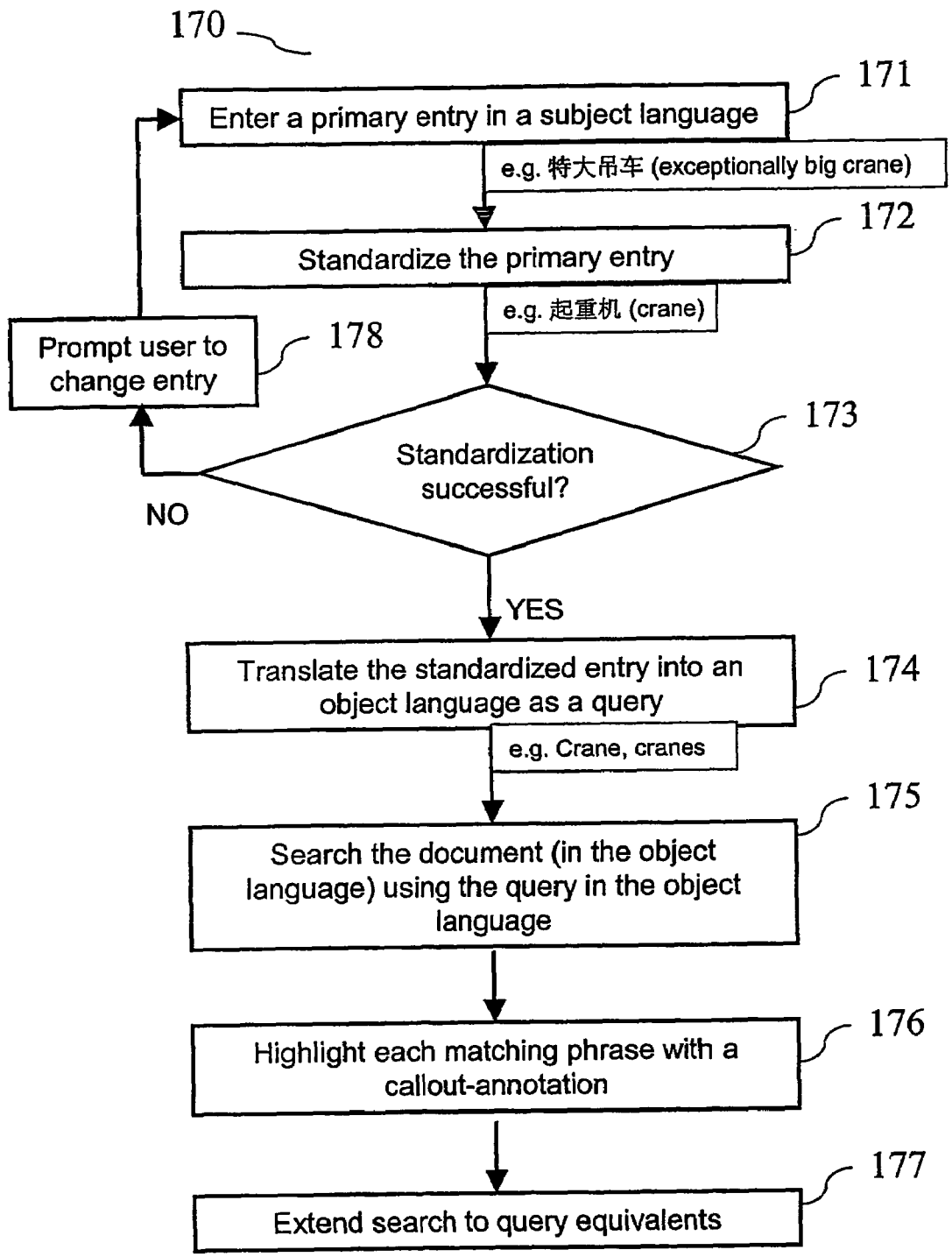
FIG. 9 is a flowchart illustrating a method according to the preferred embodiment of FIG. 3 and FIG. 6, which includes a search step triggered by the user's clicking on a hyperlinked query equivalent displayed in the callout.

FIG. 9 is a flowchart illustrating a method 170 according to one deployment of the preferred embodiment described above. The method 170 includes the steps of:

Step 171: The user enters a primary entry in a selected subject language (e.g. 特大吊 "which means an exceptionally big crane in Chinese);

Step 172: The dialectal treatment module standardizes the user's primary entry by applying a set of statistical, logic, linguistic, and/or grammatical rules (e.g. changing 特大吊 "to "起重机"which means a crane in Chinese);

Step 173: Check whether the standardization is successful;

Step 178: If the check result in step 173 is no, prompt the user to revise his entry;

Step 174: If the check result in step 173 is yes, the translator translates the standardized entry into a selected object language as a query (e.g. translating "起重机"into CRANE, CRANES);

Step 175: Search the target document using the query;

Step 176: Highlight each and every matching phrase or matching object in the target document with a callout which includes the standardized entry in the subject language (e.g. "起重机"), the primary entry in the subject language ("吊 "), the query in the object language (Crane), and/or other reading aid information.

In the deployment as illustrated in FIG. 6 where the translated query's synonyms/equivalents are displayed in the callout as hyperlinks, the method 170 further includes the step of:

Step 177: When the user clicks on any of the hyperlinked synonyms/equivalents, perform a new search using the clicked synonym/equivalent as a query.

Figure 10:
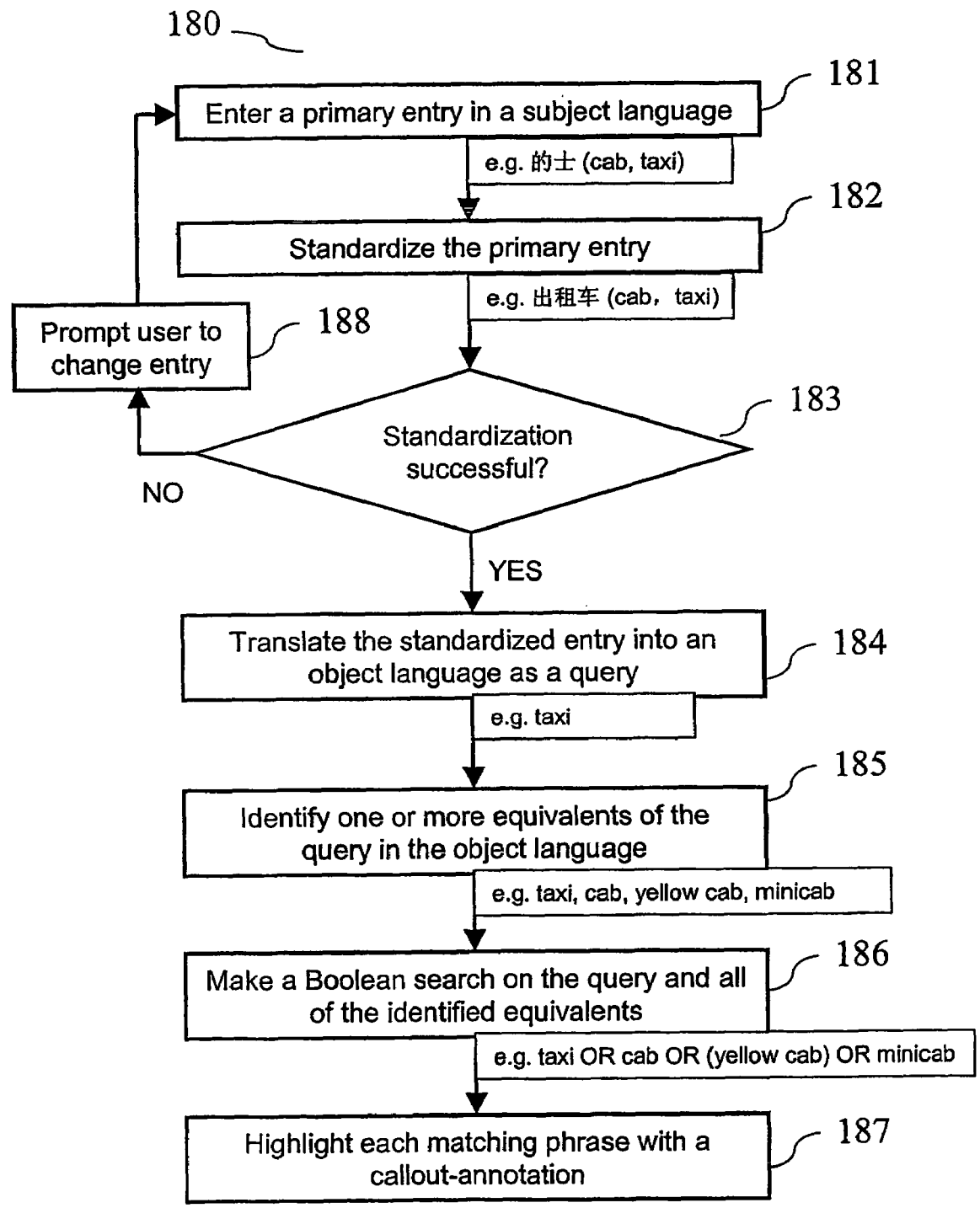
FIG. 10 is a flowchart illustrating a method according to the preferred embodiment of FIG. 3 and FIG. 5, wherein a Boolean search is performed on a query consisting of the translated query (or the optimized query in the object language) and one or more identified equivalents in the object language.

FIG. 10 is a flowchart illustrating a method 180 according to another deployment of the preferred embodiment described above. The method 180 includes the steps of:

Step 181: The user enters a primary entry in a selected subject language (e.g. 的士which in oral Chinese means a taxi or cab);

Step 182: The dialectal treatment module standardizes the user's primary entry by applying a set of statistical, logic, linguistic, and/or grammatical rules (e.g. changing 的士to 出租 ");

Step 183: Automatically check whether the standardization is successful;

Step 188: If the check result in step 183 is no, prompt the user to revise his entry;

Step 184: If the check result in step 183 is yes, the translator translates the standardized entry into a selected object language as a query (e.g. translating 出租 "into TAXI);

Step 185: Identify one or more equivalents of the query in the object language (e.g. taxi, cab, yellow cab, minicab);

Step 186: Make a Boolean search on the query and all of the identified equivalents;

Step 187: Highlight each and every matching phrase or matching object in the target document with a callout which includes the standardized entry in the subject language, the primary entry in the subject language, and/or the query or its equivalent in the object language.

Figure 11:
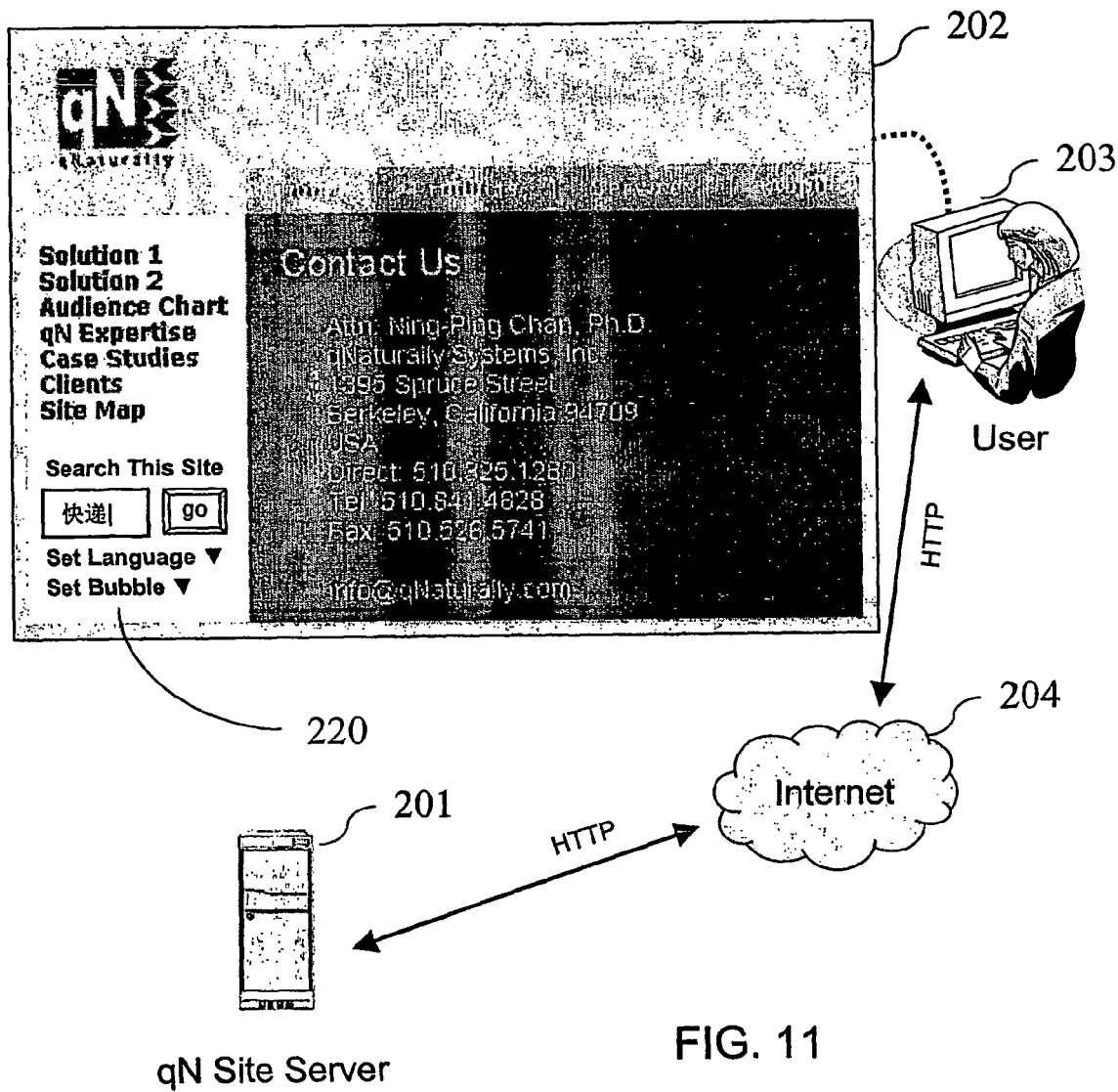
FIG. 11 is a schematic diagram illustrating an Internet based network according to another preferred embodiment of this invention wherein a website provides a user (searcher) with means to enter a query in a selected subject language and returns to the user the search results highlighted with blinking annotation callouts.

FIG. 11 is a schematic diagram illustrating an Internet based network according to another preferred embodiment of the invention, which is an application of the invention in website content management. The TSH application runs on a backend server 201 which hosts the website 202. The user (searcher) 203 visits the website 202 via the Internet 204. The website 202 includes a GUI 220 from which the user 203 may select a subject language from a variety of options and enter a primary query in the subject language to search the website. The user may also configure the callout (or bubble) to be used in highlighting the matching phrases or matching objects found in the website.

Figure 12:
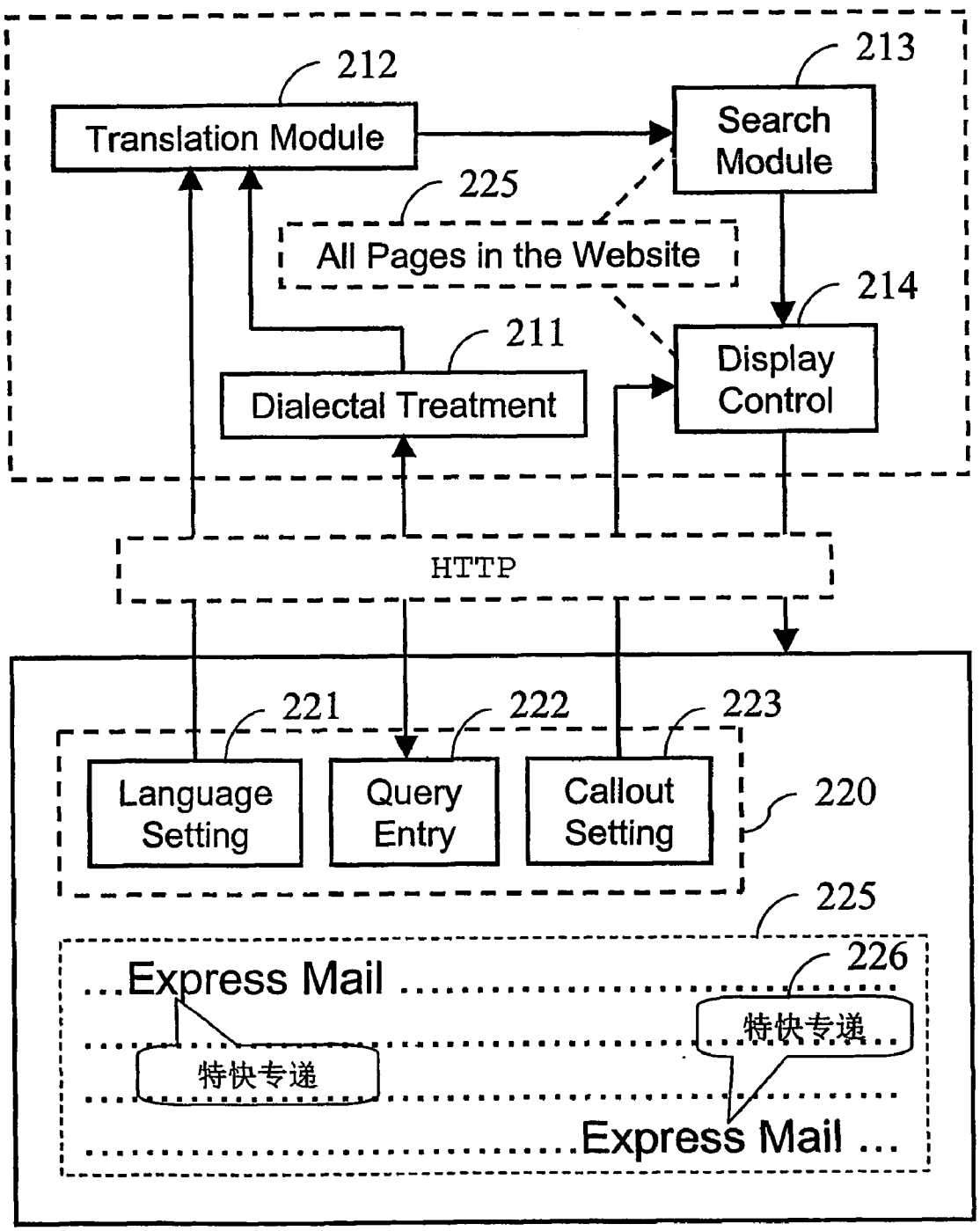
FIG. 12 is a schematic block diagram further illustrating the preferred embodiment of FIG. 11.

FIG. 12 is a schematic block diagram further illustrating the preferred embodiment of FIG. 11. The GUI 220 includes a language setting means 221 which can be either a drop-down list or a number of hyperlinked icons, each of which being representative of an option, a callout setting means 223 from which the user configures various parameters of the callout (or bubble) to be used in highlighting the matching phrases or matching objects found in this specific website, and a query entry means 222 from which the user enters a primary query in the selected subject language and clicks "go" to start the search process. The dialectal treatment module 211 applies a set of statistical, logic, linguistic, and/or grammatical rules to standardize or trim the primary entry into a more popular entry in the subject language. If the standardization fails, the server returns a prompt message to the user to revise the primary entry. The translation module 212 translates the standardized entry into the object language (i.e. the language used in the website). Then, a search operation is performed using the translated entry as a search query. The display control 214 is responsible to send a signal to highlight each matching phrase or matching object found in the pages 225 of the website. The highlighting means used in this invention is a visual cue, such as a callout 226 or a bubble, which includes annotation message. In the preferred embodiment, the visual cue is configured to be a blinking or twinkling callout.

Figure 13:
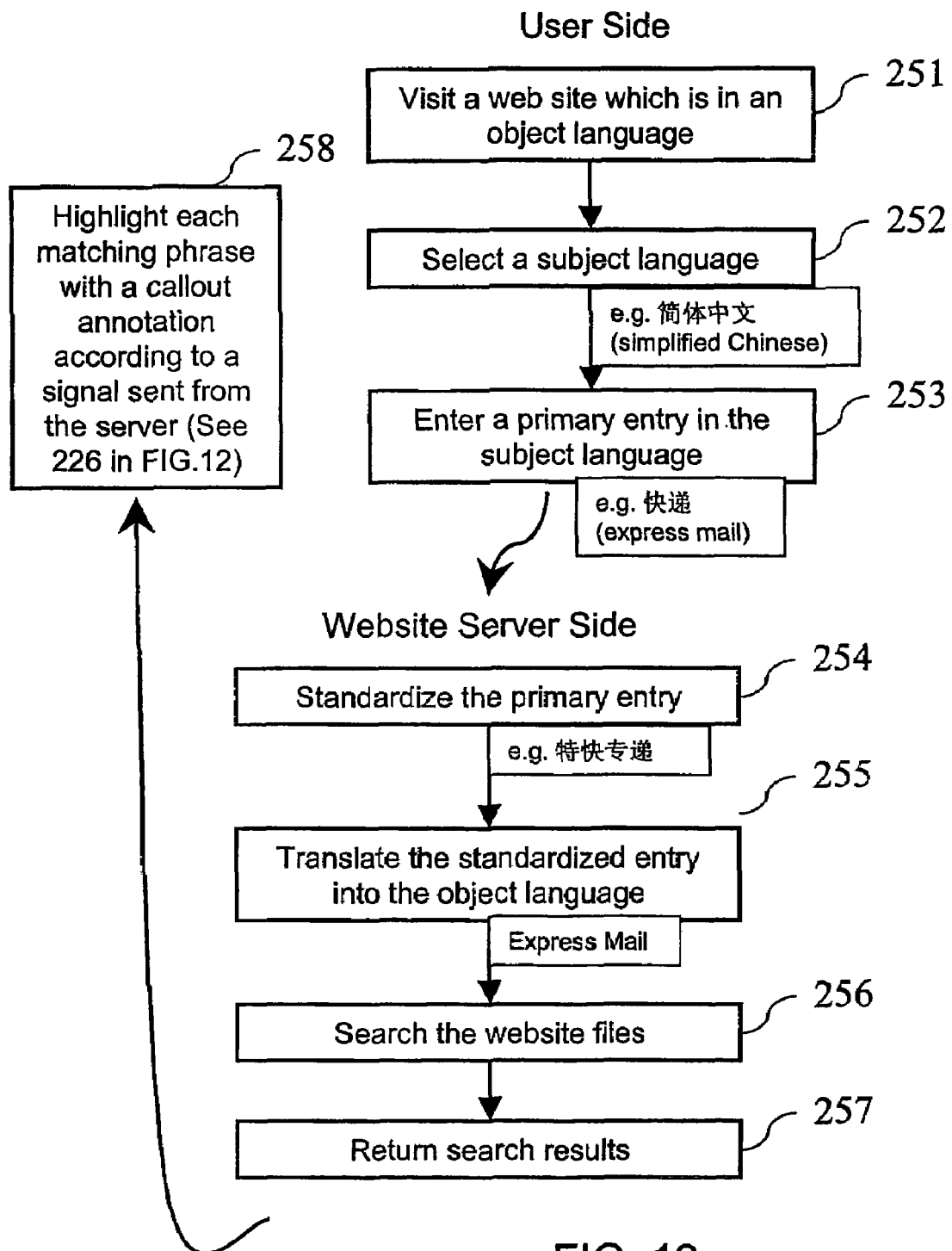
FIG. 13 is a flowchart illustrating a method according to the preferred embodiment of FIG. 11 and FIG. 12.

FIG. 13 is a flowchart illustrating a method according to the preferred embodiment of FIG. 11 and FIG. 12. The method includes the steps of:

Step 251: The user (searcher) visits a website hosted by a server (searchee) by entering the website's domain name (URL) from his browser;

Step 252: Select a subject language from the language setting means;

Step 253: Enter a primary entry in the subject language;

Step 254: The server standardizes the primary entry;

Step 255: Translate the standardized entry into the object language;

Step 256: Using the translated entry as a query, search the website files stored in the server's database;

Step 257: Return the search results to the user's computer screen; and

Step 258: Highlight each matching phrase or matching object with a callout annotation according to a signal sent from the display control 214 in the server side.

Optionally, the method may include a step to prompt the user to revise his primary entry if the server is unable to have it standardized for any reason. For example, the entered word is out of the scope of the server's database or the entered character is too general to make a meaningful search.

The method may further include a step of post-translation dialectal treatment (also called optimization step) as illustrated in FIG. 5, FIG. 6 and FIG. 9. The post-translation dialectal treatment step includes the sub-steps of:

Optimize the translated entry;
Identify one or more equivalents of the optimized entry;
Display the query equivalents as hyperlinks in the annotation callout as shown in FIG. 6; and
Perform a new search if the user clicks any of the hyperlinked equivalents.

Alternatively, the method may include a different step of post-translation dialectal treatment as illustrated in FIG. 5 and FIG. 10. This different post-translation dialectal treatment step includes the sub-steps of:

Optimize the translated entry;
Identify one or more equivalents of the optimized entry; and
Make a Boolean search on the optimized entry and all the identified equivalents.

Figure 14:
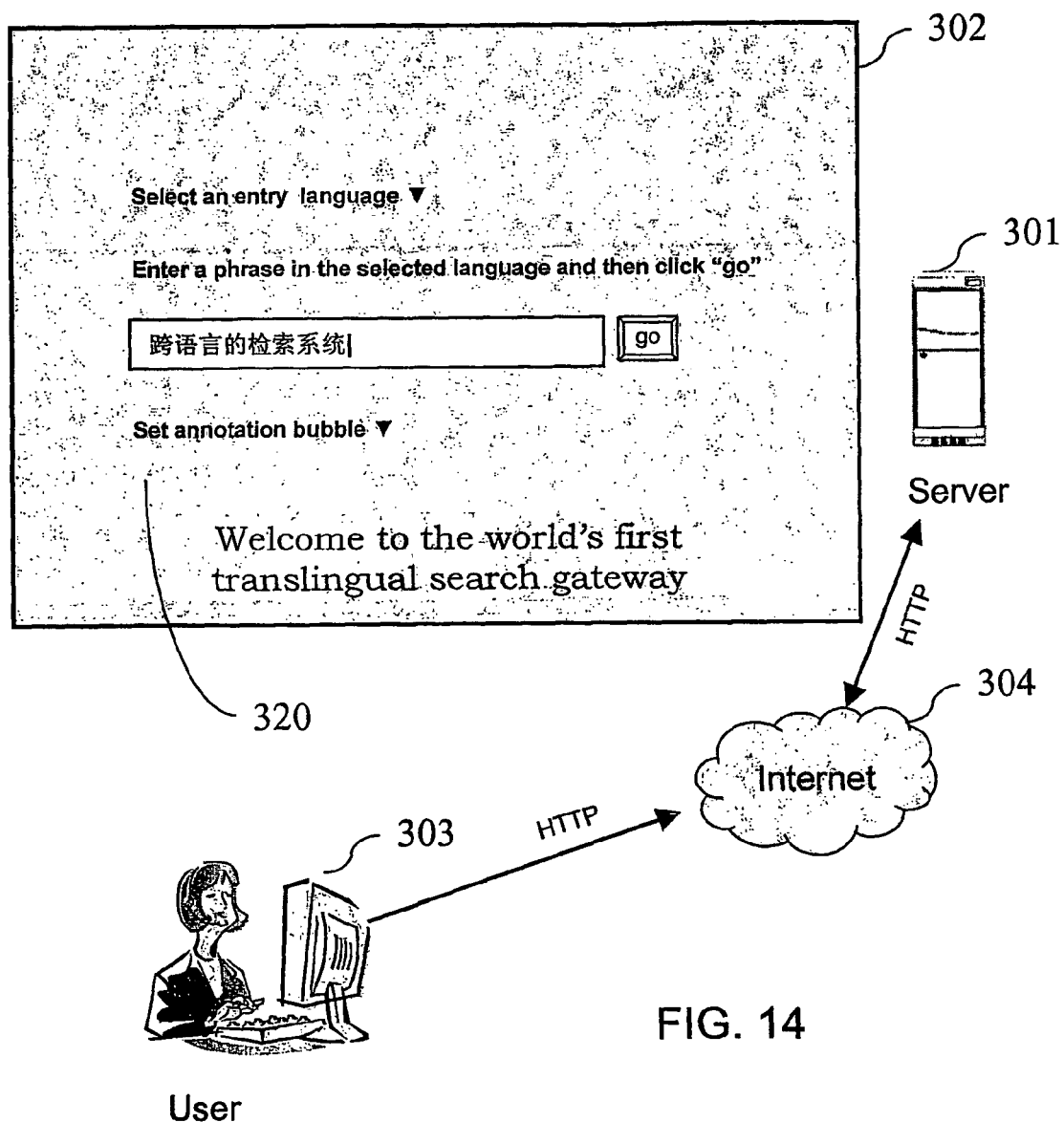
FIG. 14 is a schematic diagram illustrating an Internet based network according to another preferred embodiment of this invention wherein a web search engine host provides a user (searcher) in its main page with means to enter a query in a selected subject language and returns to the user the search results highlighted with blinking annotation callouts.

FIG. 14 is a schematic diagram illustrating an Internet based network according to another preferred embodiment of the invention, which is an application of the invention in web search engine. The TSH application runs on a backend server 301 which hosts a cross-language web search engine via its website 302. The user 303 visits the website 302 via the Internet 304. The website 302 includes a GUI 320 from which the user 303 may select a subject language from a variety of options and enter a primary query in the subject language to search the information on the Internet. The user may also configure the callout (or bubble) to be used in highlighting the matching phrases or matching objects found in the website.

Figure 15:
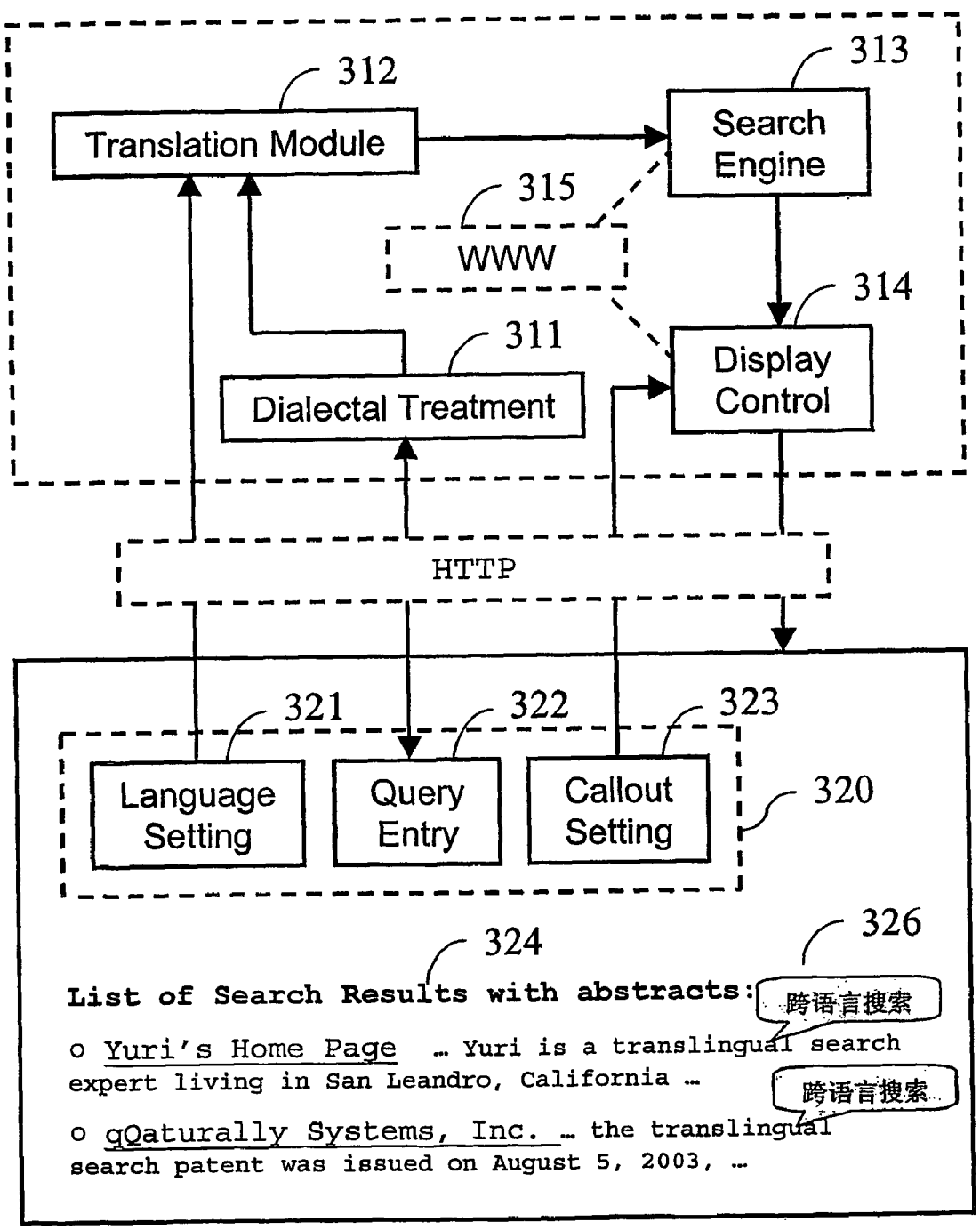
FIG. 15 is a schematic block diagram further illustrating the preferred embodiment of FIG. 14.

FIG. 15 is a schematic block diagram further illustrating the preferred embodiment of FIG. 14. The GUI 320 includes a language setting means 321 which can be either a drop-down list or a number of icons, each of which being representative of an option, a callout setting means 323 from which the user configures various parameters of the callout (or bubble) to be used in highlighting the matching phrases or matching objects found in the returned search list, and a query entry means 322 from which the user enters a primary query in the selected subject language and clicks "go" to start the search process. The dialectal treatment module 311 applies a set of statistical, logic, linguistic, and/or grammatical rules to standardize or trim the primary entry into a more popular entry in the subject language. If the standardization fails, the server returns a prompt message to the user to revise the primary entry. The translation module 312 translates the standardized entry into the object language (i.e. the language used in the website). Then, the search engine 313 performs a search operation using the translated entry as a search query. The display control 314 is responsible to send a signal to highlight each matching phrase or matching object found in the returned list of the search results 324. The highlighting means used in this invention is a visual cue, such as a callout 326 or a bubble, which includes annotation message. In the preferred embodiment, the visual cue is configured to be blinking or twinkling.

Figure 16:
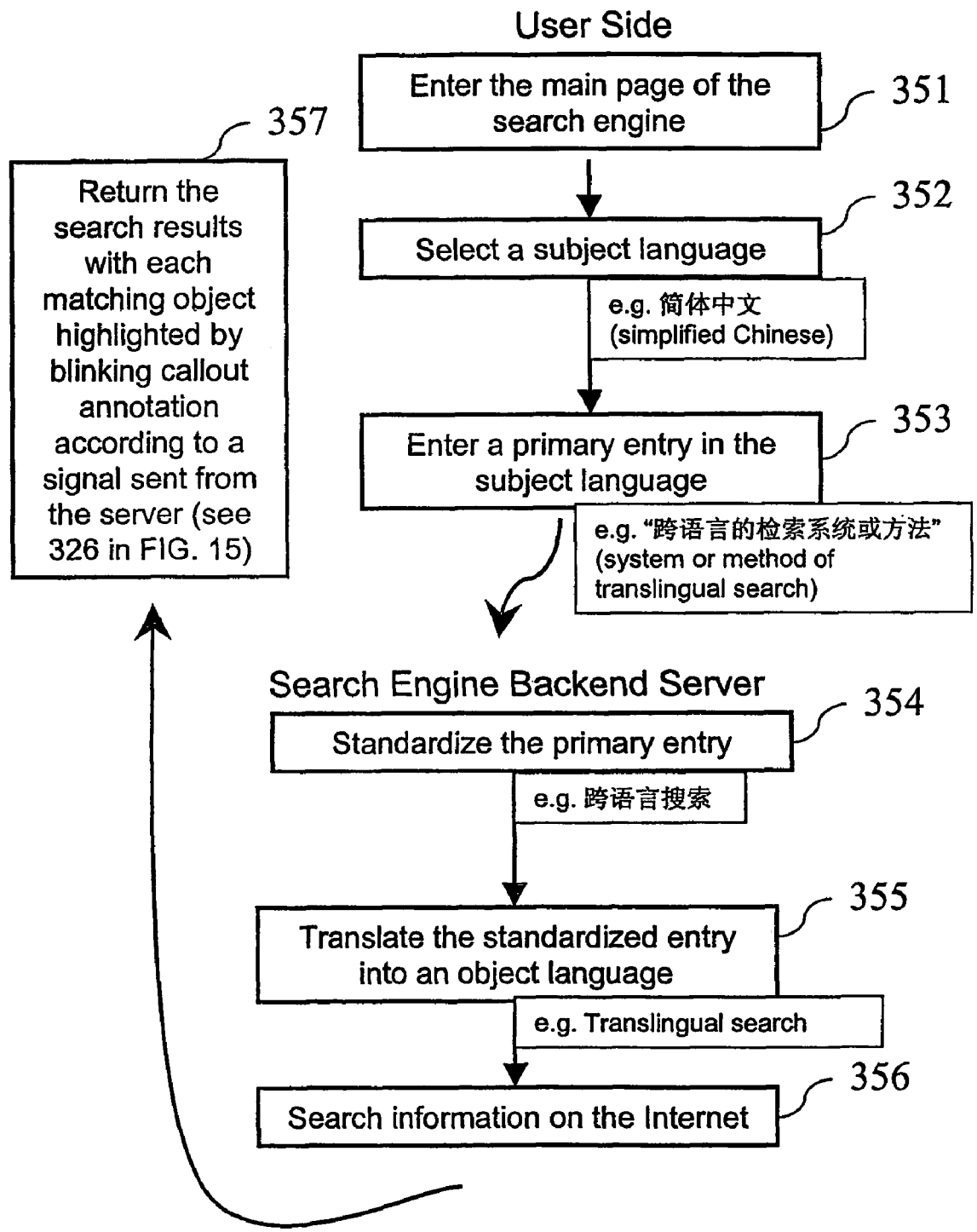
FIG. 16 is a flowchart illustrating a method according to the preferred embodiment illustrated in FIG. 14 and FIG. 15.

FIG. 16 is a flowchart illustrating a method according to the preferred embodiment of FIG. 14 and FIG. 15. The method includes the steps of:

Step 351: The user visits the main page of the search engine by entering the website's domain name (URL) from his browser;

Step 352: Select a subject language (e.g. simplified Chinese, 简体中文) from the language setting means;

Step 353: Enter a primary entry in the subject language (e.g. 跨·言的·索系·或方法, which means "system or method of cross-language search");

Step 354: The backend server standardizes the primary entry (e.g. trimming 跨·言的·索系·或方法 as 跨·言搜索, which means "cross-language search");

Step 355: Translate the standardized entry into the object language (e.g. translate 跨·言搜索 as translingual search or cross-language search);

Step 356: Using the translated entry as a query, search the information on the Internet;

Step 357: Return the search results to the user's screen with each matching phrase or matching object highlighted by a blinking callout annotation according to a signal sent from the display control 314 in the server side.

Optionally, the method may include a step to prompt the user to revise his primary entry if the server is unable to have it standardized for any reason. For example, the entered word is out of the scope of the server's database or the entered character is too general to make a meaningful search.

The method may further include a step of post-translation dialectal treatment as illustrated in FIG. 5, FIG. 6 and FIG. 9. The post-translation dialectal treatment step includes the sub-steps of:

Optimize the translated entry;
Identify one or more equivalents of the optimized entry;
Display the query equivalents as hyperlinks in the annotation callout as shown in FIG. 6; and
Perform a new search if the user clicks any of the hyperlinked equivalents.

Alternatively, the method may include a different step of post-translation dialectal treatment as illustrated in FIG. 5 and FIG. 10. This different post-translation dialectal treatment step includes the sub-steps of:

Optimize the translated entry;
Identify one or more equivalents of the optimized entry; and
Make a Boolean search on the query and all the identified equivalents.

The invention described above is useful in many fields such as legal practice, science, business, news, logistics, patents, and education, etc. It can also be applied in search engines and databases, ePublication, as well as Jp2Eng, Jp2Cn, Jp2Kr, Eng2Sp, etc.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A system for searching a piece of information contained in an electronic searchable document comprising a processor, a first memory that stores at least one program used by said processor to perform operations required for the search and a second memory which is available to said at least one program for operation, the system further comprising:
- a means for dialectally standardizing a primary entry in a first language entered by the user;
- a means for translating the standardized entry into a query in a second language;
- a means for performing a search on the query; and
- a means for highlighting each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

2. The system of claim 1, further comprising:
a means for setting languages,
said language setting means comprising any of:
a dropdown list; and
a set of hyperlinked icons, each of which being representative of an option.

3. The system of claim 1, wherein said dialectal standardization means applies a set of statistical, logic, linguistic, and/or grammatical rules to said primary entry.

4. The system of claim 1, further comprising:
a means for prompting the user to enter a different entry in the event that said dialectal standardization means fails to standardize said primary entry.

5. The system of claim 1, wherein said visual cue is blinking.

6. The system of claim 1, further comprising:
a means for optimizing said translated entry,
wherein said search means performs a search on said optimized query.

7. The system of claim 6, said annotation message comprises said standardized entry in the first language and said optimized query in the second language.

8. The system of claim 6, wherein said annotation message comprises said standardized query in the first language, said optimized query in the second language, and one or more equivalents of said optimized query in the second language, each of said equivalents being hyperlinked, clicking on which triggering a new search on the clicked equivalent.

9. The system of claim 1, further comprising:
a means for optimizing said translated entry and providing one or more equivalents of said optimized entry,
wherein said search means performs a Boolean search on a query consisting of said optimized query and said one or more equivalents.

10. In an electronic cross-language search system for searching a piece of information contained in an electronic searchable document comprising a processor, a first memory that stores at least one program used by said processor to perform operations required for the search and a second memory which is available to said at least one program for operation, a method performed by said at least one program comprising the steps of:
- dialectally standardizing a primary entry in a first language entered by the user;
- translating the standardized entry into a query in a second language;
- performing a search on the translated query; and
- highlighting each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

11. The method of claim 10, further comprising the step of:
accepting the user's language settings,
said language settings comprising selecting an option from any of:
a dropdown list; and
a set of hyperlinked icons, each of which being representative of an option.

12. The method of claim 10, wherein said dialectal standardization means applies a set of statistical, logic, linguistic, and/or grammatical rules to said primary entry.

13. The method of claim 10, further comprising:
prompting the user to enter a different entry in the event that said dialectal standardization means fails to standardize said primary entry.

14. The method of claim 10, wherein said visual cue is blinking.

15. The method of claim 10, further comprising the step of:
optimizing said translated entry,
wherein said search step is performed on said optimized entry.

16. The method of claim 15, said annotation message comprises said standardized query in the first language and said optimized query in the second language.

17. The method of claim 15, wherein said annotation message comprises said standardized query in the first language, said optimized query in the second language, and one or more equivalents of said optimized query in the second language, each of said equivalents being hyperlinked, clicking on which triggering a new search on the clicked equivalent.

18. The method of claim 10, further comprising the steps of:
optimizing said translated entry; and
providing one or more equivalents of said optimized entry,
wherein said search step is performed on a Boolean query consisting of said optimized entry and said one or more equivalents.

19. A computer usable medium containing instructions in computer readable form for carrying out a process for cross-language search with each matching object in the search result highlighted with a blinking annotation callout, said process comprising the steps of:
- dialectally standardizing a primary entry in a first language entered by the user;
- translating the standardized query into a query in a second language;
- performing a search on the translated query; and
- highlighting each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

20. The computer usable medium of claim 19, further comprising the step of:
accepting the user's language settings,
said language settings comprising selecting an option from any of:

a dropdown list; and a set of hyperlinked icons, each of which being representative of an option.

21. The computer usable medium of claim 19, wherein said dialectal standardization means applies a set of statistical, logic, linguistic, and/or grammatical rules to said primary entry.

22. The computer usable medium of claim 19, further comprising:

prompting the user to enter a different entry in the event that said dialectal standardization means fails to standardize said primary entry.

23. The computer usable medium of claim 19, wherein said visual cue is blinking.

24. The computer usable medium of claim 19, further comprising the step of:

optimizing said translated entry as a query, wherein said search step is performed on said optimized query.

25. The computer usable medium of claim 24, said annotation message comprises said standardized entry in the first language and said optimized query in the second language.

26. The computer usable medium of claim 24, wherein said annotation message comprises said standardized entry in the first language, said optimized query in the second language, and one or more equivalents of said optimized query in the second language, each of said equivalents being hyperlinked, clicking on which triggering a new search on the clicked equivalent.

27. The computer usable medium of claim 19, further comprising the steps of:

optimizing said translated query; and providing one or more equivalents of said optimized query, wherein said search step is performed on a Boolean query consisting of said optimized query and said one or more equivalents.

28. In an Internet based electronic cross-language search system for searching a piece of information contained in a website hosted by a backend server which comprises at least one processor, a first memory that stores at least one program used by said at least one processor to perform operations required for the search and a second memory which is available to said at least one program for operation, a method performed by said at least one program comprising the steps of:

dialectally standardizing a primary entry in a first language entered by the user over the Internet;

translating the standardized entry into a query in a second language;

performing a search on the translated query; and sending a signal to highlight each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

29. The method of claim 28, further comprising the step of:

accepting the user's language settings, said language settings comprising selecting an option from any of:

a dropdown list; and a set of hyperlinked icons, each of which being representative of an option.

30. The method of claim 28, wherein said dialectal standardization means applies a set of statistical, logic, linguistic, and/or grammatical rules to said primary entry.

31. The method of claim 28, further comprising:

prompting the user to enter a different entry in the event that said dialectal standardization means fails to standardize said primary entry.

32. The method of claim 28, wherein said visual cue is blinking.

33. The method of claim 28, further comprising the step of:

optimizing said translated query, wherein said search step is performed on said optimized query.

34. The method of claim 33, said annotation message comprises said standardized entry in the first language and said optimized query in the second language.

35. The method of claim 33, wherein said annotation message comprises said standardized entry in the first language, said optimized query in the second language, and one or more equivalents of said optimized query in the second language, each of said equivalents being hyperlinked, clicking on which triggering a new search on the clicked equivalent.

36. The method of claim 28, further comprising the steps of:

optimizing said translated query; and providing one or more equivalents of said optimized query, wherein said search step is performed on a Boolean query consisting of said optimized query and said one or more equivalents.

37. An Internet based electronic cross-language search system for searching a piece of information contained in a website hosted by a backend server that comprises at least one processor, a first memory that stores at least one program used by said at least processor to perform operations required for the search and a second memory which is available to said at least one program for operation, said backend server being communicatively coupled to a remote user's computer over the Internet, the system further comprising:

a means for dialectally standardizing a primary entry in a first language entered by the user, a means for translating the standardized entry into a query in a second language;

a means for performing a search on the translated query; and a means for sending a signal to highlight each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

38. The system of claim 37, further comprising:

a means for setting languages, said language setting means comprising any of:

a dropdown list; and a set of hyperlinked icons, each of which being representative of an option.

39. The system of claim 37, wherein said dialectal standardization means applies a set of statistical, logic, linguistic, and/or grammatical rules to said primary entry.

40. The system of claim 37, further comprising:
a means for prompting the user to enter a different entry in the event that said dialectal standardization means fails to standardize said primary entry.

41. The system of claim 37, wherein said visual cue is blinking.

42. The system of claim 37, further comprising:
a means for optimizing said translated query,
wherein said search means performs a search on said optimized query.

43. The system of claim 42, said annotation message comprises said standardized entry in the first language and said optimized query in the second language.

44. The system of claim 42, wherein said annotation message comprises said standardized entry in the first language, said optimized query in the second language, and one or more equivalents of said optimized query in the second language, each of said equivalents being hyperlinked, clicking on which triggering a new search on the clicked equivalent.

45. The system of claim 37, further comprising:
a means for optimizing said translated query and providing one or more equivalents of said optimized query,
wherein said search means performs a Boolean search on a query consisting of said optimized query and said one or more equivalents of said optimized query.

46. In a global network comprising a server and at least one client computer communicatively coupled to the server, said server comprising a dialectical treatment module, a translation module, a search engine and a display module, which in combination performs a process, the process comprising the steps of:
dialectally standardizing a primary entry in a first language entered by a remote user via said at least one client computer,
translating the standardized entry into a query in a second language;
performing a search on the translated query; and
sending a signal to said at least one client computer to highlight each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

47. The process of claim 46, further comprising the step of:
accepting the user's language settings,
said setting commands comprising selecting an option from any of:
a dropdown list; and
a set of hyperlinked icons, each of which being representative of an option.

48. The process of claim 46, wherein said dialectal standardization step comprising the step of:
applying a set of statistical, logic, linguistic, and/or grammatical rules to said primary entry.

49. The process of claim 46, further comprising:
prompting the user to enter a different entry in the event that said dialectal standardization means fails to standardize said primary entry.

50. The process of claim 46, wherein said visual cue is blinking.

51. The process of claim 46, further comprising the step of:
optimizing said translated query,
wherein said search step is performed on said optimized query.

52. The process of claim 51, said annotation message comprises said standardized entry in the first language and said optimized query in the second language.

53. The process of claim 51, wherein said annotation message comprises said standardized entry in the first language, said optimized query in the second language, and one or more equivalents of said optimized query in the second language, each of said equivalents being hyperlinked, clicking on which triggering a new search on the clicked equivalent.

54. The process of claim 46, further comprising the steps of:
optimizing said translated query; and
providing one or more equivalents of said optimized query,
wherein said search step is performed on a Boolean query consisting of said optimized query and said one or more equivalents.

55. A system for searching the information on the Internet comprising a server and at least one client computer communicatively coupled to said server, wherein said server comprises at least one processor, a first memory that stores at least one program used by said at least processor to perform operations required for the search and a second memory which is available to said at least one program for operation, the system further comprising:
a means for dialectally standardizing a primary entry in a first language entered by a remote user via a graphical user interface on the screen of said at least one client computer;
a means for translating the standardized entry into a query in a second language;
a means for performing a search on the translated query; and
a means for sending a signal to highlight each matching object by associating a visual cue with said each matching object, said visual cue being adaptive to contain an annotation message, wherein each visual cue comprises a tail that points at or connects to the matching object, and wherein said annotation message comprises said standardized entry in the first language and said query in the second language.

56. The system of claim 55, further comprising:
a means for setting languages,
said language setting means comprising any of:
a dropdown list; and
a set of hyperlinked icons, each of which being representative of an option.

57. The system of claim 55, wherein said dialectal standardization means applies a set of statistical, logic, linguistic, and/or grammatical rules to said primary entry.

58. The system of claim 55, further comprising:
a means for prompting the user to enter a different entry in the event that said dialectal standardization means fails to standardize said primary entry.

59. The system of claim 55, wherein said visual cue is blinking.

60. The system of claim 55, further comprising:
a means for optimizing said translated query,
wherein said search means performs a search on said optimized query.

61. The system of claim 60, said annotation message comprises said standardized entry in the first language and said optimized query in the second language.

62. The system of claim 60, wherein said annotation message comprises said standardized entry in the first language, said optimized query in the second language, and one or more equivalents of said optimized query in the second language, each of said equivalents being hyperlinked, clicking on which triggering a new search on the clicked equivalent.

63. The system of claim 55, further comprising:
a means for optimizing said translated query and providing one or more equivalents of said optimized query, wherein said search means performs a Boolean search on a query consisting of said optimized query and said one or more equivalents.

* * * * *